Nov. 22, 1938.   E. S. BUCHANAN   2,137,562
COASTER BRAKE
Filed Nov. 4, 1936   2 Sheets-Sheet 1

Inventor

E. S. Buchanan

By Clarence A. O'Brien
Hyman Berman
Attorneys

Nov. 22, 1938.　　　E. S. BUCHANAN　　　2,137,562
COASTER BRAKE
Filed Nov. 4, 1936　　　2 Sheets-Sheet 2

Inventor
E. S. Buchanan
By Clarence A. O'Brien
Hyman Berman
Attorneys

Patented Nov. 22, 1938

2,137,562

UNITED STATES PATENT OFFICE 2,137,562

COASTER BRAKE

Edward S. Buchanan, Riverdale, N. J.

Application November 4, 1936, Serial No. 109,167

3 Claims. (Cl. 192—6)

My invention relates generally to a coaster brake, and particularly to a coaster brake characterized by reduction in number and complexity of parts, and by simple and direct action, and an important object of the invention is to provide an arrangement of this character which can be constructed at low cost and which can be easily serviced.

Other important objects of my invention will be apparent from a reading of the following description taken in connection with the drawings, wherein for purposes of illustration I have shown a preferred embodiment of my invention.

In the drawings—

Figure 1:
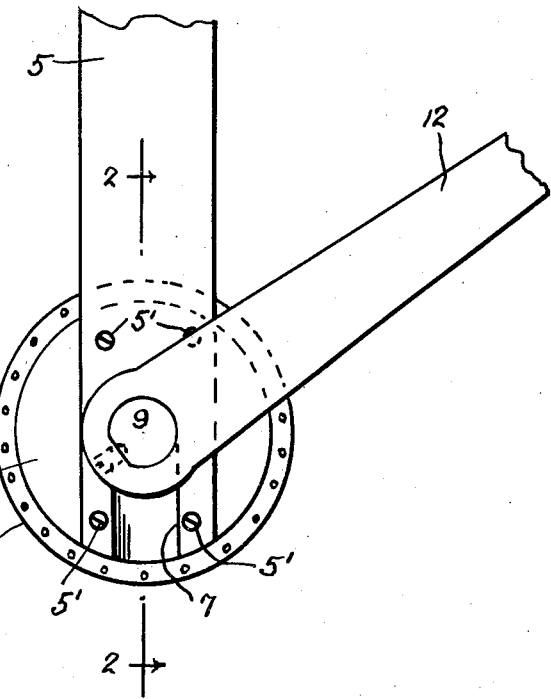
Figure 1 is an end elevational view of the embodiment.
Figure 4:
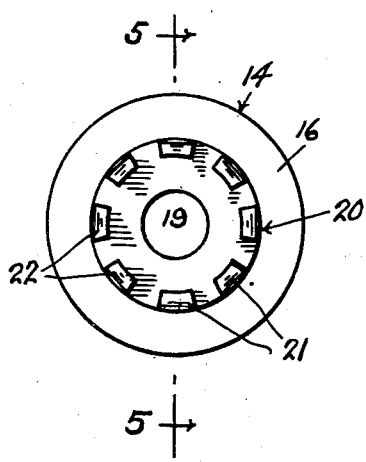
Figure 4 is an end elevational view looking from right to left of the brake shoe which is integral with the left end.
Figure 5:
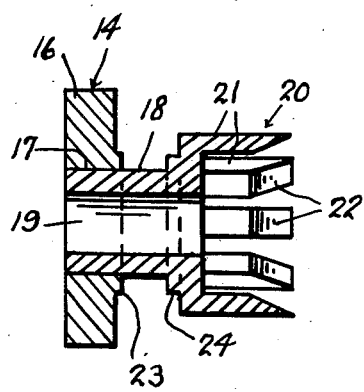
Figure 5 is a longitudinal sectional view taken through Figure 4 approximately on the line 5—5 and looking toward the right in the direction of the arrows.

Referring in detail to the drawings, the numerals 5 and 6 refer respectively to the front or rear forks of such as a velocipede or a bicycle or similar vehicle and which are bifurcated as indicated by the numerals 7 and 8 at their lower ends to straddle the opposite ends of the shaft or axle 9 which has pinned thereto as indicated by the numerals 10 and 11 the respective pedals 12 and 13 which work outside of the forks 5 and 6 with a slight clearance between the pedal 13 and the member 6.

Inwardly of the forks 5 and 6 the axle 9 works in the left end 14 and the right end 15 which are provided with conforming bores receiving these portions of the axle.

The left end 14 is composed of an annulus 16 having a bore 17 in which is set a tubular portion 18 possessing the bore 19 in which the axle works. The right hand end of the tubular part 18 has mounted thereon or integral therewith the brake shoe 20 which is in the form of a cup facing in the right hand direction and with its sides constituted by circumferentially spaced longitudinally extending teeth 21 which are beveled as indicated by the numeral 22 on their inner sides at their right hand terminals. Shoulders 23 and 24 on the tubular portion define a channel to receive the bearing 25 which may be of the ball or roller type.

The right end 15 consists of the annulus 26 similar to the annulus 16 and a tubular part 27 similar to the tubular part 18 formed with a shoulder 28 similar to the shoulder 23, but the tubular part 27 is devoid of a shoulder 24 and of the brake shoe 20. The shoulder 28 abuts one side of the bearing 29.

Figure 3:
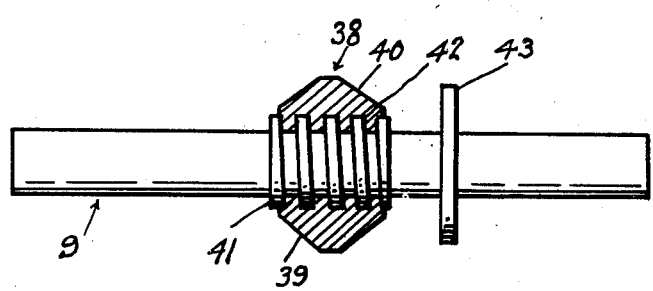
Figure 3 is a longitudinal sectional elevational view showing the mounting of the expander cone on the axle.

The hub 30 is tubular in form and has axially spaced thereon series of spoke attaching lugs 31 and 32 to which the respective spokes 33 and 34 are attached to form the wheel. At its opposite ends the hub is provided with grooves 35 and 35' which engage the peripheries and the axially inner sides of the bearings 25 and 29 as shown in Figure 3.

The left hand end of the bore of the hub 30 is sufficiently large to receive and clear the periphery of the brake shoe 20 when the brake shoe 20 is in an unexpanded condition, and the right hand portion of the bore of the hub is reduced as indicated by the numeral 36 and leading to this reduced portion is the taper 37.

Adjacent the taper 37 and adjacent the beveled ends of the teeth on the brake shoe there is mounted on the shaft 9 the expander cone which is generally designated 38 and which has opposed beveled surfaces 39 and 40 and is mounted on the shaft 9 by means of the worm threads 41 working in accommodating worm grooves 42 in the bore of the cone.

Figure 2:
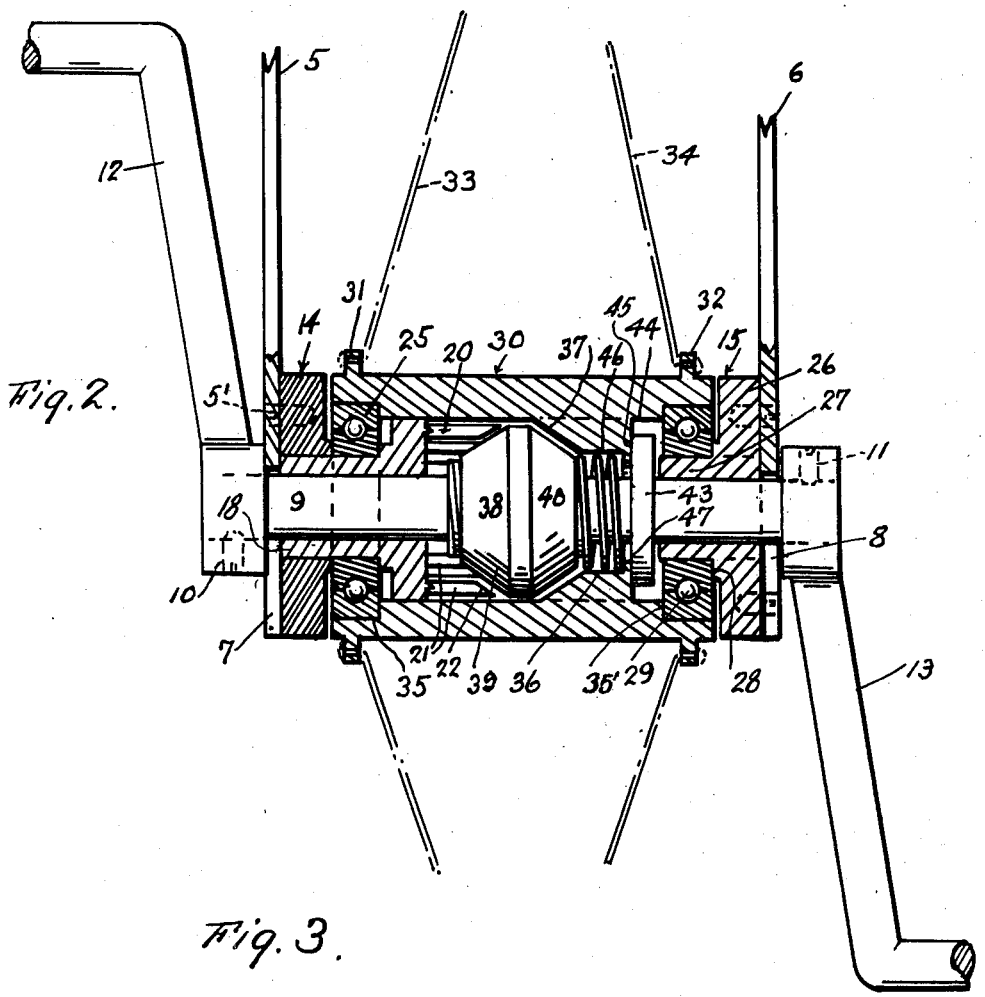
Figure 2 is a longitudinal sectional view taken through Figure 1 approximately on the line 2—2 and looking toward the right in the direction of the arrow.

Axially spaced to the right of the worm threads 41 and integral with the shaft 9 is the pressure annulus 43 which occupies a position in a chamber 44 defined by the right hand end of the reduced portion of the bore and the bearing 29 as shown in Figure 2 and is normally close to but out of engagement with the abutment 45 which is in this chamber.

A helical spring 46 is circumposed on the shaft 9 between a retaining shoulder 47 and the adjacent side of the expander cone 38. This spring is of a diameter to form a loose fit in the reduced portion 36 of the bore of the hub, and the action of the spring is to provide a slight pressure against the cone 38 so that the cone will be moved to brake operating position more quickly when the forward motion of the axle 9 is stopped, thereby automatically taking up for the slight wear of the brake shoe 20.

Turning the cranks 12 and 13 in the forward direction turns the axle 9 which in turn causes the expander cone 38 (by way of the thread on the axle 9) to move to the right, thereby engaging taper 37. This operation creates a binding pressure between cone 38 and the hub 30 and the pressure annulus 43, thereby causing rotation of the hub 30 with the axle 9 and turning the wheel. At stopping the cranks 12 and 13 the hub 30 continues to rotate in the forward direction, and this is the coasting operation.

To apply the brake, backward thrust is imposed on the cranks 12 and 13 which draws the expander cone 38 to the left into the beveled surfaces 22 of the teeth 21 of the brake shoe 20 thereby expanding the teeth 21 and causing them to frictionally engage the inside of the bore of the hub 30 so as to stop rotation of hub, and consequently of the wheel.

Although I have shown and described herein a preferred embodiment of my invention, it is to be definitely understood that I do not desire to limit my application of the invention thereto, and any change or changes may be made in the materials, and in the structure and arrangement of the parts, within the spirit of the invention and the scope of the subjoined claims.

What is claimed is:

1. A coaster brake of the character described comprising an axle equipped with axle rotating and stopping means, relatively stationary means including bearings journaling said axle, a tubular hub, means mounting said hub rotatably on portions of said stationary means, said stationary means including an expansible shoe fixed thereto and extending within said tubular hub, an expander cone threaded on said axle and having a surface for engaging and expanding said shoe against the interior of said tubular hub for braking the rotation of the hub relative to said axle, a pressure annulus fixed on said axle, an interior shoulder in said hub with which said annulus is arranged to frictionally engage in a direction opposite that of the expanding movement of said cone.

2. A coaster brake of the character described comprising an axle equipped with axle rotating and stopping means, relatively stationary means including bearings journaling said axle, a tubular hub, means mounting said hub rotatably on said stationary means, said stationary means including an expansible shoe fixed thereto and within said tubular hub, an expander cone threaded on said axle and having a surface for engaging and expanding said shoe against the interior of said tubular hub for braking the rotation of the hub relative to said axle, said hub having an interior taper having an abutment at one end, said cone having a surface engageable with said taper when the axle is rotated in a forward direction at a higher speed than the hub or while the hub is stationary, and a pressure annulus on said axle adapted to frictionally engage said abutment in opposition to the pressure exerted by the cone on said taper for locking said axle and said hub together for forward drive.

3. A coaster brake of the character described comprising an axle equipped with axle rotating and stopping means, relatively stationary means including bearings journaling said axle, a tubular hub, means mounting said hub rotatably on said stationary means, said stationary means including an expansible shoe fixed thereto and within said hubular hub, an expander cone threaded on said axle and having a surface for engaging and expanding said shoe against the interior of said tubular hub for braking the rotation of the hub relative to said axle, said hub having an interior taper having an abutment at one end, said cone having a surface engageable with said taper when the axle is rotated in a forward direction at a higher speed than the hub or while the hub is stationary, and a pressure annulus on said axle adapted to frictionally engage said abutment in opposition to the pressure exerted by the cone on said taper for locking said axle and said hub together for forward drive, and spring means for restoring the initial position of said cone when the axle's rotation is retarded relative to the hub.

EDWARD S. BUCHANAN.